(12) United States Patent
Steenblik et al.

(10) Patent No.: US 8,867,134 B2
(45) Date of Patent: Oct. 21, 2014

(54) OPTICAL SYSTEM DEMONSTRATING IMPROVED RESISTANCE TO OPTICALLY DEGRADING EXTERNAL EFFECTS

(75) Inventors: Richard A. Steenblik, Alpharetta, GA (US); Mark J. Hurt, Duluth, GA (US); Samuel M. Cape, Woodstock, GA (US); Gregory R. Jordan, Cumming, GA (US)

(73) Assignee: Visual Physics, LLC, Alpharetta, GA (US)

( * ) Notice: Subject to any disclaimer, the term of this patent is extended or adjusted under 35 U.S.C. 154(b) by 375 days.

(21) Appl. No.: 12/820,320

(22) Filed: Jun. 22, 2010

(65) Prior Publication Data

US 2010/0308571 A1 Dec. 9, 2010

Related U.S. Application Data

(60) Continuation-in-part of application No. 11/771,623, filed on Jun. 29, 2007, now Pat. No. 8,120,855, and a continuation-in-part of application No. 11/932,468, filed on Oct. 31, 2007, now Pat. No. 8,111,462, which is a division of application No. 10/995,859, filed on Nov. 22, 2004, now Pat. No. 7,333,268.

(60) Provisional application No. 60/524,281, filed on Nov. 21, 2003, provisional application No. 60/538,392, filed on Jan. 22, 2004, provisional application No. 60/627,234, filed on Nov. 12, 2004.

(51) Int. Cl.
*G02B 27/10* (2006.01)
*G02B 3/00* (2006.01)
*B42D 15/00* (2006.01)
*G02B 27/22* (2006.01)
*D21H 21/44* (2006.01)

(52) U.S. Cl.
CPC ......... *B42D 15/0013* (2013.01); *G02B 3/0031* (2013.01); *B42D 2035/20* (2013.01); *G02B 3/0056* (2013.01); *B42D 2035/28* (2013.01); *B42D 15/0026* (2013.01); *G02B 27/2214* (2013.01); *B42D 2035/44* (2013.01); *D21H 21/44* (2013.01)
USPC ........................................................ 359/619

(58) Field of Classification Search
USPC ................................................. 359/618–626
See application file for complete search history.

(56) References Cited

U.S. PATENT DOCUMENTS 992,151 A 5/1911 Berthon
1,824,353 A 9/1931 Jensen (Continued)

FOREIGN PATENT DOCUMENTS

AU 2009278275 7/2012
CN 1126970 11/2003

(Continued)

OTHER PUBLICATIONS

Gale, M. T., et al., Chapter 6—Replication, Micro Optics: Elements, Systems and Applications, 1997, pp. 153-177.

(Continued)

*Primary Examiner* — Alicia M Harrington
(74) *Attorney, Agent, or Firm* — Holland & Bonzagni, P.C.; Mary R. Bonzagni, Esq.

(57) ABSTRACT

A system for projecting one or more synthetic optical images, which demonstrates improved resistance to optically degrading external effects, is provided. The inventive system serves to lock the focal length of the focusing elements in place. In other words, no other transparent materials or layers brought into contact with the inventive system will serve to materially alter the focal length or the optical acuity of synthetic images formed by the system.

77 Claims, 1 Drawing Sheet

(56) References Cited

U.S. PATENT DOCUMENTS

| | | |
|---|---|---|
| 1,849,036 A | 3/1932 | Ernst |
| 1,942,841 A | 1/1934 | Shimizu |
| 2,268,351 A | 12/1941 | Tanaka |
| 2,432,896 A | 12/1947 | Hotchner |
| 2,888,855 A | 6/1959 | Tanaka |
| 2,992,103 A | 7/1961 | Land et al. |
| 3,122,853 A | 3/1964 | Koonz |
| 3,241,429 A | 3/1966 | Rice et al. |
| 3,264,164 A | 8/1966 | Jerothe |
| 3,312,006 A | 4/1967 | Rowland |
| 3,357,772 A | 12/1967 | Rowland |
| 3,463,581 A | 8/1969 | Clay |
| 3,609,035 A | 9/1971 | Ataka |
| 3,643,361 A | 2/1972 | Eaves |
| 3,704,068 A | 11/1972 | Waly |
| 3,811,213 A | 5/1974 | Eaves |
| 3,887,742 A | 6/1975 | Reinnagel |
| 4,025,673 A | 5/1977 | Reinnagel |
| 4,073,650 A | 2/1978 | Yevick |
| 4,082,426 A | 4/1978 | Brown |
| 4,185,191 A | 1/1980 | Stauffer |
| 4,345,833 A | 8/1982 | Siegmund |
| 4,417,784 A | 11/1983 | Knop et al. |
| 4,498,736 A | 2/1985 | Griffin |
| 4,507,349 A | 3/1985 | Fromson et al. |
| 4,534,398 A | 8/1985 | Crane |
| 4,634,220 A | 1/1987 | Hockert et al. |
| 4,645,301 A | 2/1987 | Orensteen et al. |
| 4,662,651 A | 5/1987 | Mowry, Jr. |
| 4,688,894 A | 8/1987 | Hockert |
| 4,691,993 A | 9/1987 | Porter et al. |
| 4,756,972 A | 7/1988 | Kloosterboer et al. |
| 4,765,656 A | 8/1988 | Becker et al. |
| 4,814,594 A | 3/1989 | Drexler |
| 4,892,336 A | 1/1990 | Kaule et al. |
| 4,892,385 A | 1/1990 | Webster, Jr. et al. |
| 4,920,039 A | 4/1990 | Fotland et al. |
| 4,935,335 A | 6/1990 | Fotland |
| 4,988,126 A | 1/1991 | Heckenkamp et al. |
| 5,074,649 A | 12/1991 | Hamanaka |
| 5,085,514 A | 2/1992 | Mallik et al. |
| 5,211,424 A | 5/1993 | Bliss |
| 5,215,864 A | 6/1993 | Laakmann |
| 5,232,764 A | 8/1993 | Oshima |
| 5,254,390 A | 10/1993 | Lu |
| 2,355,902 A | 8/1994 | Berg |
| 5,359,454 A | 10/1994 | Steenblik et al. |
| 5,384,861 A | 1/1995 | Mattson et al. |
| 5,393,099 A | 2/1995 | D'Amato |
| 5,433,807 A | 7/1995 | Heckenkamp et al. |
| 5,449,200 A | 9/1995 | Andric et al. |
| 5,461,495 A | 10/1995 | Steenblik et al. |
| 5,464,690 A | 11/1995 | Boswell |
| 5,468,540 A | 11/1995 | Lu |
| 5,479,507 A | 12/1995 | Anderson |
| 5,492,370 A | 2/1996 | Chatwin et al. |
| 5,555,476 A | 9/1996 | Suzuki et al. |
| 5,568,313 A | 10/1996 | Steenblik et al. |
| 5,575,507 A | 11/1996 | Yamauchi et al. |
| 5,598,281 A | 1/1997 | Zimmerman et al. |
| 5,623,347 A | 4/1997 | Pizzanelli |
| 5,623,368 A | 4/1997 | Calderini et al. |
| 5,626,969 A | 5/1997 | Joson |
| 5,631,039 A | 5/1997 | Knight et al. |
| 5,639,126 A | 6/1997 | Dames et al. |
| 5,642,226 A | 6/1997 | Rosenthal |
| 5,643,678 A | 7/1997 | Boswell |
| 5,670,003 A | 9/1997 | Boswell |
| 5,674,580 A | 10/1997 | Boswell |
| 5,688,587 A | 11/1997 | Burchard et al. |
| 5,695,346 A | 12/1997 | Sekiguchi et al. |
| 5,712,731 A | 1/1998 | Drinkwater et al. |
| 5,723,200 A | 3/1998 | Oshima |
| 5,737,126 A | 4/1998 | Lawandy |
| 5,753,349 A | 5/1998 | Boswell |
| 5,759,683 A | 6/1998 | Boswell |
| 5,783,017 A | 7/1998 | Boswell |
| 5,800,907 A | 9/1998 | Yumoto |
| 5,810,957 A | 9/1998 | Boswell |
| 5,812,313 A | 9/1998 | Johansen |
| 5,886,798 A | 3/1999 | Staub et al. |
| 5,933,276 A | 8/1999 | Magee |
| 5,995,638 A | 11/1999 | Amidror |
| 6,030,691 A | 2/2000 | Burchard et al. |
| 6,036,230 A | 3/2000 | Farber |
| 6,036,233 A | 3/2000 | Braun et al. |
| 6,060,143 A | 5/2000 | Tompkin |
| 6,084,713 A | 7/2000 | Rosenthal |
| 6,089,614 A | 7/2000 | Howland et al. |
| 6,106,950 A | 8/2000 | Searle et al. |
| 6,176,582 B1 | 1/2001 | Grasnick |
| 6,179,338 B1 | 1/2001 | Bermann et al. |
| 6,195,150 B1 | 2/2001 | Silverbrook |
| 6,256,149 B1 | 7/2001 | Rolfe |
| 6,256,150 B1 | 7/2001 | Rosenthal |
| 6,283,509 B1 | 9/2001 | Braun et al. |
| 6,288,842 B1 | 9/2001 | Florczak et al. |
| 6,301,363 B1 | 10/2001 | Mowry, Jr. |
| 6,328,342 B1 | 12/2001 | Belousov et al. |
| 6,329,040 B1 | 12/2001 | Oshima et al. |
| 6,345,104 B1 | 2/2002 | Rhoads |
| 6,348,999 B1 | 2/2002 | Summersgill et al. |
| 6,350,036 B1 | 2/2002 | Hannington et al. |
| 6,369,947 B1 | 4/2002 | Staub et al. |
| 6,373,965 B1 | 4/2002 | Liang |
| 6,381,071 B1 | 4/2002 | Dona |
| 6,414,794 B1 | 7/2002 | Rosenthal |
| 6,424,467 B1 | 7/2002 | Goggins |
| 6,450,540 B1 | 9/2002 | Kim |
| 6,467,810 B2 | 10/2002 | Taylor et al. |
| 6,473,238 B1 | 10/2002 | Daniell |
| 6,500,526 B1 | 12/2002 | Hannington |
| 6,542,646 B1 | 4/2003 | Bar-Yona |
| 6,558,009 B2 | 5/2003 | Hannington et al. |
| 6,587,276 B2 | 7/2003 | Daniell |
| 6,616,803 B1 | 9/2003 | Isherwood et al. |
| 6,641,270 B2 | 11/2003 | Hannington et al. |
| 6,671,095 B2 | 12/2003 | Summersgill et al. |
| 6,712,399 B1 | 3/2004 | Drinkwater et al. |
| 6,721,101 B2 | 4/2004 | Daniell |
| 6,724,536 B2 | 4/2004 | Magee |
| 6,726,858 B2 | 4/2004 | Andrews |
| 6,751,024 B1 | 6/2004 | Rosenthal |
| 6,761,377 B2 | 7/2004 | Taylor et al. |
| 6,795,250 B2 | 9/2004 | Johnson et al. |
| 6,803,088 B2 | 10/2004 | Kaminsky et al. |
| 6,819,775 B2 | 11/2004 | Amidror et al. |
| 6,833,960 B1 | 12/2004 | Scarbrough et al. |
| 6,856,462 B1 | 2/2005 | Scarbrough et al. |
| 6,870,681 B1 | 3/2005 | Magee |
| 6,900,944 B2 | 5/2005 | Tomczyk |
| 6,935,756 B2 | 8/2005 | Sewall et al. |
| 7,030,997 B2 | 4/2006 | Neureuther et al. |
| 7,058,202 B2 | 6/2006 | Amidror |
| 7,068,434 B2 | 6/2006 | Florczak et al. |
| 7,114,750 B1 | 10/2006 | Alasia et al. |
| 7,194,105 B2 | 3/2007 | Hersch et al. |
| 7,246,824 B2 | 7/2007 | Hudson |
| 7,254,265 B2 | 8/2007 | Naske et al. |
| 7,255,911 B2 | 8/2007 | Lutz et al. |
| 7,288,320 B2 | 10/2007 | Steenblik et al. |
| 7,336,422 B2 | 2/2008 | Dunn et al. |
| 7,372,631 B2 | 5/2008 | Ozawa |
| 7,389,939 B2 | 6/2008 | Jones et al. |
| 7,422,781 B2 | 9/2008 | Gosselin |
| 7,457,038 B2 | 11/2008 | Dolgoff |
| 7,457,039 B2 | 11/2008 | Raymond et al. |
| 7,504,147 B2 | 3/2009 | Hannington |
| 7,545,567 B2 | 6/2009 | Tomczyk |
| 7,630,954 B2 | 12/2009 | Adamczyk et al. |
| 7,686,187 B2 | 3/2010 | Pottish et al. |
| 7,712,623 B2 | 5/2010 | Wentz et al. |
| 7,763,179 B2 | 7/2010 | Levy et al. |
| 7,812,935 B2 | 10/2010 | Cowburn et al. |

(56) References Cited

U.S. PATENT DOCUMENTS

| | | |
|---|---|---|
| 7,830,627 B2 | 11/2010 | Commander et al. |
| 7,849,993 B2 | 12/2010 | Finkenzeller et al. |
| 8,027,093 B2 | 9/2011 | Commander et al. |
| 8,057,980 B2 | 11/2011 | Dunn et al. |
| 8,149,511 B2 | 4/2012 | Kaule et al. |
| 2001/0048968 A1 | 12/2001 | Cox et al. |
| 2002/0014967 A1 | 2/2002 | Crane et al. |
| 2002/0185857 A1 | 12/2002 | Taylor et al. |
| 2003/0031861 A1 | 2/2003 | Reiter et al. |
| 2003/0112523 A1 | 6/2003 | Daniell |
| 2003/0179364 A1 | 9/2003 | Steenblik et al. |
| 2003/0183695 A1 | 10/2003 | Labrec et al. |
| 2003/0228014 A1 | 12/2003 | Alasia et al. |
| 2003/0232179 A1 | 12/2003 | Steenblik et al. |
| 2003/0234294 A1 | 12/2003 | Uchihiro et al. |
| 2004/0100707 A1 | 5/2004 | Kay et al. |
| 2004/0140665 A1 | 7/2004 | Scarbrough et al. |
| 2004/0209049 A1 | 10/2004 | Bak |
| 2005/0094274 A1 | 5/2005 | Souparis |
| 2005/0104364 A1 | 5/2005 | Keller et al. |
| 2005/0161501 A1 | 7/2005 | Giering et al. |
| 2006/0003295 A1 | 1/2006 | Hersch et al. |
| 2006/0017979 A1 | 1/2006 | Goggins |
| 2006/0018021 A1 | 1/2006 | Tomkins et al. |
| 2007/0058260 A1 | 3/2007 | Steenblik et al. |
| 2007/0092680 A1 | 4/2007 | Chaffins et al. |
| 2007/0183045 A1* | 8/2007 | Schilling et al. .............. 359/567 |
| 2007/0183047 A1 | 8/2007 | Phillips et al. |
| 2007/0273143 A1 | 11/2007 | Crane et al. |
| 2007/0284546 A1 | 12/2007 | Ryzi et al. |
| 2007/0291362 A1* | 12/2007 | Hill et al. ...................... 359/567 |
| 2008/0130018 A1 | 6/2008 | Steenblik et al. |
| 2008/0160226 A1 | 7/2008 | Kaule et al. |
| 2008/0182084 A1* | 7/2008 | Tompkin et al. ........... 428/195.1 |
| 2009/0034082 A1 | 2/2009 | Commander et al. |
| 2009/0315316 A1 | 12/2009 | Staub et al. |
| 2010/0018644 A1 | 1/2010 | Sacks et al. |
| 2010/0068459 A1 | 3/2010 | Wang et al. |
| 2010/0109317 A1 | 5/2010 | Hoffmuller et al. |
| 2010/0177094 A1 | 7/2010 | Kaule et al. |
| 2010/0182221 A1 | 7/2010 | Kaule et al. |
| 2010/0194532 A1 | 8/2010 | Kaule |
| 2010/0208036 A1 | 8/2010 | Kaule |
| 2010/0328922 A1 | 12/2010 | Peters et al. |
| 2012/0019607 A1 | 1/2012 | Dunn et al. |
| 2012/0033305 A1 | 2/2012 | Moon et al. |
| 2013/0010048 A1 | 1/2013 | Dunn et al. |

FOREIGN PATENT DOCUMENTS

| | | |
|---|---|---|
| DE | 19804858 | 8/1999 |
| DE | 19932240 | 1/2001 |
| EP | 0090130 | 10/1983 |
| EP | 0092691 | 11/1983 |
| EP | 0118222 | 9/1984 |
| EP | 0203752 | 12/1986 |
| EP | 0253089 | 1/1988 |
| EP | 0318717 | 6/1989 |
| EP | 0415230 | 3/1991 |
| EP | 0319157 | 7/1992 |
| EP | 0930174 | 7/1999 |
| EP | 0997750 | 5/2000 |
| EP | 1356952 | 10/2003 |
| EP | 1659449 | 5/2006 |
| EP | 1876028 | 1/2008 |
| EP | 2335937 | 6/2011 |
| EP | 2162294 | 3/2012 |
| FR | 2803939 | 7/2001 |
| GB | 1095286 | 12/1967 |
| GB | 2362493 | 11/2001 |
| JP | 41-004953 | 3/1966 |
| JP | 46-022600 | 8/1971 |
| JP | H04234699 | 8/1992 |
| JP | 11-501590 | 2/1999 |
| JP | 11189000 | 7/1999 |
| JP | 2000-256994 | 9/2000 |
| JP | 2001-055000 | 2/2001 |
| JP | 2001-324949 | 11/2001 |
| JP | 2003039583 | 2/2003 |
| JP | 2003-165289 | 6/2003 |
| JP | 2003-528349 | 9/2003 |
| JP | 2004-262144 | 9/2004 |
| KR | 10-0194536 | 6/1999 |
| RU | 2111125 | 5/1998 |
| RU | 2245566 | 1/2005 |
| TW | 575740 | 2/2004 |
| WO | WO 96/35971 | 11/1996 |
| WO | WO 97/19820 | 6/1997 |
| WO | WO 97/44769 | 11/1997 |
| WO | WO 98/13211 | 4/1998 |
| WO | WO 98/15418 | 4/1998 |
| WO | WO 98/26373 | 6/1998 |
| WO | 99/26793 | 6/1999 |
| WO | WO 99/66356 | 12/1999 |
| WO | WO 01/07268 | 2/2001 |
| WO | WO 01/11591 | 2/2001 |
| WO | 01/39138 | 5/2001 |
| WO | WO 01/63341 | 8/2001 |
| WO | WO 01/71410 | 9/2001 |
| WO | WO 02/40291 | 5/2002 |
| WO | WO 02/43012 | 5/2002 |
| WO | WO 03/005075 | 1/2003 |
| WO | WO 03/007276 | 1/2003 |
| WO | WO 03/022598 | 3/2003 |
| WO | WO 03/053713 | 7/2003 |
| WO | WO 03/061980 | 7/2003 |
| WO | WO 03/061983 | 7/2003 |
| WO | WO 03/082598 | 10/2003 |
| WO | WO 03/098188 | 11/2003 |
| WO | WO 2004/022355 | 3/2004 |
| WO | 2004/036507 | 4/2004 |
| WO | 2004/087430 | 10/2004 |
| WO | WO 2005/106601 | 11/2005 |
| WO | 2007/076952 | 7/2007 |
| WO | 2009/000527 | 12/2008 |
| WO | 2009/000528 | 12/2008 |
| WO | 2009/000529 | 12/2008 |
| WO | 2009/000530 | 12/2008 |
| WO | WO 2009/121784 | 10/2009 |
| WO | 2010/015383 | 2/2010 |

OTHER PUBLICATIONS

Leech, Patrick W., et al., Printing via hot embossing of optically variable images in thermoplastic acrylic lacquer, Microelectronic Engineering, 2006, pp. 1961-1965, vol. 83, No. 10, Elsevier Publishers BV, Amsterdam, NL.

Phillips, Roger W., et al., Security Enhancement of Holograms with Interference Coatings, Optical Security and Counterfeit Deterrence Techniques III, 2000, pp. 304-316, SPIE vol. 3973, San Jose, CA.

Steenblik, Richard A., et al., UNISON Micro-optic Security Film, Optical Security and Counterfeit Deterrence Techniques V, 2004, pp. 321-327, SPIE vol. 5310, San Jose, CA.

Van Renesse, Rudolf L., Optical Document Security, 1994, Artech House Inc., Norwood, MA.

Wolpert, Gary R., Design and development of an effective optical variable device based security system incorporating additional synergistic security technologies, Optical Security and Counterfeit Deterrence Techniques III, 2000, pp. 55-61, SPIE vol. 3973, San Jose, CA.

Fletcher, D.A., et al., "Near-field infrared imaging with a microfabricated solid immersion lens", Applied Physics Letters, Oct. 2, 2000, pp. 2109-2111, vol. 77, No. 14.

Hutley, M.C., et al., "The Moiré Magnifier", Pure Appl. Opt. 3, 1994, pp. 133-142, IOP Publishing Ltd., UK.

Hutley, M.C., "Integral Photography, Superlenses and the Moiré Magnifier", European Optical Society, 1993, pp. 72-75, vol. 2, UK.

Hutley, M., et al., "Microlens Arrays", Physics World, Jul. 1991, pp. 27-32.

Kamal, H., et al., "Properties of Moiré Magnifiers", Opt. Eng., Nov. 1998, pp. 3007-3014, vol. 37, No. 11.

(56) References Cited

OTHER PUBLICATIONS

Lippmann, G., "Photgraphie—Épreuves Réversibles, Photographies Intégrals", Académie des Sciences, 1908, pp. 446-451, vol. 146, Paris.

Liu, S., et al., "Artistic Effects and Application of Moiré Patterns in Security Holograms", Applied Optics, Aug. 1995, pp. 4700-4702, vol. 34, No. 22.

Zhang, X., et al., "Concealed Holographic Coding for Security Applications by Using a Moiré Technique", Applied Optics, Nov. 1997, pp. 8096-8097, vol. 36, No. 31.

Drinkwater, K. John, et al., "Development and applications of Diffractive Optical Security Devices for Banknotes and High Value Documents", Optical Security and Counterfeit Deterrence Techniques III, 2000, pp. 66-79, SPIE vol. 3973, San Jose, CA.

Hardwick, Bruce and Ghioghiu Ana, "Guardian Substrate As an Optical Medium for Security Devices", Optical Security and Counterfeit Deterrence Techniques III, 2000, pp. 176-179, SPIE vol. 3973, San Jose, CA.

Van Renesse, Rudolf L., Optical Document Security, 1998, 2nd edition, pp. 232-235, 240-241 and 320-321, Artech House Inc., Norwood, MA (ISBN 0-89006-982-4).

Van Renesse, Rudolf L., Optical Document Security, 2005, 3rd edition, pp. 62-169, Artech House Inc., Norwood, MA (ISBN 1-58053-258-6).

Extended European Search Report dated Jan. 11, 2012 for European Divisional Patent Publication No. 2335944.

\* cited by examiner

OPTICAL SYSTEM DEMONSTRATING IMPROVED RESISTANCE TO OPTICALLY DEGRADING EXTERNAL EFFECTS

RELATED APPLICATIONS

This application is a continuation-in-part of U.S. patent application Ser. No. 11/771,623, filed Jun. 29, 2007 (now U.S. Pat. No. 8,120,855), and of U.S. patent application Ser. No. 11/932,468, filed Oct. 31, 2007 (now U.S. Pat. No. 8,111,462), both of which are divisionals of and claim priority to U.S. patent application Ser. No. 10/995,859, filed Nov. 22, 2004 (now U.S. Pat. No. 7,333,268), which claims priority to U.S. Provisional Patent Application Ser. No. 60/524,281, filed Nov. 21, 2003, U.S. Provisional Patent Application Ser. No. 60/538,392, filed Jan. 22, 2004, and U.S. Provisional Patent Application Ser. No. 60/627,234, filed Nov. 12, 2004, all of which are hereby incorporated herein by reference in their entirety.

TECHNICAL FIELD

The present invention generally relates to an optical system for projecting one or more synthetic optical images, which demonstrates improved resistance to optically degrading external effects.

BACKGROUND AND SUMMARY OF THE INVENTION

Micro-optic materials for projecting synthetic images generally comprise (a) a light-transmitting polymeric substrate, (b) an arrangement of micro-sized image icons located on or within the polymeric substrate, and (c) an arrangement of focusing elements (e.g., microlenses). The image icon and focusing element arrangements are configured such that when the arrangement of image icons is viewed through the arrangement of focusing elements, one or more synthetic images are projected. These projected images may show a number of different optical effects. Material constructions capable of presenting such effects are described in U.S. Pat. No. 7,333,268 to Steenblik et al., U.S. Pat. No. 7,468,842 to Steenblik et al., U.S. Pat. No. 7,738,175 to Steenblik et al., International Patent Publication No. WO 2005/106601 A2 to Commander et al., International Patent Publication No. WO 2007/076952 A2 to Kaule et al.; International Patent Publication No. WO 2009/000527 to Kaule et al.; International Patent Publication No. WO 2009/000528 to Kaule et al.; International Patent Publication No. WO 2009/000529 to Kaule et al.; and International Patent Publication No. WO 2009/000530 to Kaule.

These optically variable materials may be used as security devices for authentication of banknotes, other secure documents, and products. For banknotes and other secure documents, such optically variable materials are typically used in the form of a strip, thread, patch, or overlay and either partially embedded within the banknote or other secure document, or applied to a surface thereof. These materials may also be used as a standalone product that serves as a substrate for a subsequent printing or personalization process.

The present inventors have determined that these optically variable materials possess a certain degree of optical sensitivity related to susceptibility on the part of the focusing element arrangement (e.g., focusing element array) to soiling, physical ablation (e.g., scratching), and to disturbances in focal properties whenever a disrupting material is brought into contact with a surface of the array. Disrupting materials causing such a disturbance in focal properties include adhesive coated substrates (e.g., tapes), liquids, or other materials having a refractive index that is different from that of air. In particular, the synthetic image or images projected by these materials tend to disappear, defocus, or blur when such a disrupting material is applied to the focusing element array surface, the disrupting material causing an undesirable alteration in the angle of refraction at the array surface.

The present invention addresses this issue by providing a system for projecting one or more synthetic optical images, which demonstrates improved resistance to optically degrading external effects. The inventive system basically comprises:

(a) one or more arrangements of image icons; and
(b) one or more partially or totally embedded arrangements of image icon focusing elements,
wherein the one or more arrangements of image icon focusing elements is disposed relative to the one or more arrangements of image icons such that at least a portion of the image icon focusing elements forms at least one synthetic image of at least a portion of the image icons.

In an exemplary embodiment, the one or more arrangements of image icon focusing elements are refractive focusing elements (e.g., microlenses). The refractive index from an outer surface of this exemplary system to refracting interfaces is varied between a first and a second refractive index, the first refractive index being substantially or measurably different than the second refractive index.

In this exemplary embodiment, the arrangement(s) of focusing elements lie between a viewer's eyes and the arrangement(s) of image icons, with variation of the refractive index achieved using a material (hereinafter referred to as "the second material") that either (i) fills interstitial spaces between at least a portion of the image icon focusing elements and/or covers these focusing elements, forming a distinct interface with the material used to form the focusing elements (hereinafter referred to as "the first material"), or (ii) diffuses into the first material thereby forming a gradient interface with the first material. The second material may either partially or totally embed the arrangement(s) of focusing elements or may encapsulate the inventive system. More preferably, the second material either forms an outer boundary (or layer) of the arrangement(s) of image icon focusing elements (total embedment of the arrangement(s) of focusing elements), or forms an outer boundary (or layer) of both the arrangement(s) of image icon focusing elements and the arrangement(s) of image icons (total encapsulation of the system).

The phrase "substantially or measurably different", as used herein, means a difference in refractive index (e.g., between the first and second materials) that causes the focal length(s) of the focusing elements to change at least about 0.1 micron.

The focal length(s) of the focusing elements in the inventive system is locked in place by ensuring that interfaces (e.g., refracting interfaces) responsible for focus are embedded within the system. In other words, no other transparent materials or layers brought into contact with the inventive system will serve to materially alter the focal length(s), or the optical acuity of the synthetic image(s) formed by this system.

By way of the present invention, the inventors have found that in addition to providing the system with improved resistance to optically degrading external effects, the use of a material having a substantially or measurably different refractive index (e.g., the second material) over the image icon focusing elements may increase the F number of the focusing elements so as to cause exaggerated optical effects. For example, upon tilting the inventive system, synthetic images may appear deeper or further above the system, or may appear to move faster, depending on the desired optical effect.

In one preferred embodiment, the system comprises: (a) an array of image icons; (b) an array of image icon focusing elements formed from a first material having a refractive index (n1); and (c) a second material having a different refractive index (n2) that fills interstitial spaces between and/or covers the focusing elements, a distinct interface being formed between the first and second materials. In this preferred embodiment, the second material, which may totally embed the focusing element array by forming an outer boundary (or layer) of the array, may also be used to cover or embed the array of image icons, thereby encapsulating the system.

When the refractive index of the first material (n1) is greater than the refractive index of the second material (n2) [n1>n2], the focusing elements in this preferred embodiment are converging (e.g., convex) lenses. Conversely, when the refractive index of the first material (n1) is less than the refractive index of the second material (n2) [n1<n2], the focusing elements in this preferred embodiment are diverging (e.g., concave) lenses.

The embodiment in which the second material totally embeds the focusing element array may be used in the form of, for example, a security strip, thread, patch, or overlay and mounted to a surface of, or at least partially embedded within a fibrous or non-fibrous sheet material (e.g., banknote, passport, identification or ID card, credit card, label), or commercial product (e.g., optical disks, CDs, DVDs, packages of medical drugs), etc., for authentication purposes. This embodiment may also be used in the form of a standalone product (e.g., a substrate for subsequent printing or personalization), or in the form of a non-fibrous sheet material for use in making, for example, banknotes, passports, and the like. As will be readily appreciated by those skilled in the art, the visual effects offered by the inventive optical system serve to greatly increase the counterfeit resistance of these materials.

The embodiment in which the second material totally encapsulates the inventive system by forming an outer boundary (or layer) of both the array of image icon focusing elements and the array of image icons may be used as described above, or may adopt a thicker, more robust form for use as, for example, a base platform for an ID card, high value or other security document.

In another preferred embodiment, no distinct interface is formed between the array of focusing elements and the second material. Instead, the system comprises: (a) an array of image icons; and (b) an array of image icon focusing elements (e.g., GRIN lenses) formed from a first material having a refractive index (n1) and a second material having a different refractive index (n2), the second material diffusing into the first material thereby forming a gradient interface with the first material. The gradient interface acts as a focusing element, the refractive index changing spatially between, for example, outer boundaries of the second and first materials. In this preferred embodiment, the second material serves to totally embed the array of focusing elements and may also be used to cover or embed the array of image icons. Contemplated uses for this exemplary embodiment include those uses identified above.

The present invention further provides sheet materials and base platforms that are made from or employ the inventive optical system, as well as documents made from these materials. The term "documents", as used herein designates documents of any kind having financial value, such as banknotes or currency, bonds, checks, traveler's checks, lottery tickets, postage stamps, stock certificates, title deeds and the like, or identity documents, such as passports, ID cards, driving licenses and the like, or non-secure documents, such as labels. The inventive optical system is also contemplated for use with consumer goods as well as bags or packaging used with consumer goods.

Other features and advantages of the invention will be apparent to one of ordinary skill from the following detailed description and accompanying drawings. Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

The present disclosure may be better understood with reference to the following drawings. Matching reference numerals designate corresponding parts throughout the drawings, and components in the drawings are not necessarily to scale, emphasis instead being placed upon clearly illustrating the principles of the present disclosure. While exemplary embodiments are disclosed in connection with the drawings, there is no intent to limit the present disclosure to the embodiment or embodiments disclosed herein. On the contrary, the intent is to cover all alternatives, modifications and equivalents.

Particular features of the disclosed invention are illustrated by reference to the accompanying drawings in which.

DETAILED DESCRIPTION OF THE INVENTION

Figure 1:
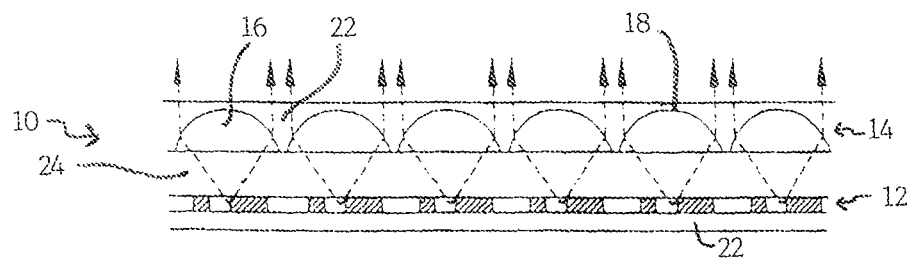
FIG. 1 is a cross-sectional side view of one embodiment of the encapsulated optical system of the present invention, where the optical system employs an array of converging (e.g., convex) lenses.

As described in detail in, for example, U.S. Pat. No. 7,333,268 to Steenblik et al., the focal length of the focusing elements in micro-optic materials determines the optical separation of the focusing elements from an image icon array. In other words, the arrays in these prior art micro-optic materials are positioned so as to align the focal point of each focusing element with their associated image icon(s). When the focal point lies on or within the image icon array, the synthetic image is in sharp focus. When, however, the focal point lies above or below the image icon array, the synthetic image is blurry and out of focus.

By way of exemplary embodiments of the present invention, the geometry of the focusing elements (e.g., microlenses) and the refractive indices of both the first material and the second material are tailored to achieve the desired focal length and thus the optical separation (if any) between arrays. Without such tailoring, the focal length of the focusing elements would be either too long or too short (i.e., the focal point of each focusing element would fall above or below the array of image icons) for the system to produce one or more synthetic images.

The physical properties of the components in these exemplary embodiments are designed to work only when used in combination with each other. As will be readily apparent to those skilled in the art, when tailoring focusing elements to arrive at a desired focal length, one would normally consider the radius of curvature and refractive indices of the material(s) used to make the focusing elements and the surrounding/encapsulating material (usually air). The difference(s) between indices, when combined with the radius of curvature, determines the angle of refraction. With a gradient index (GRIN) material, the radius of curvature is determined by the concentration of the gradient, which together with the difference(s) between indices of refraction determines the angle of refraction.

The inventive optical system will now be described in one of its exemplary forms that being a system comprising (a) one or more arrangements of image icons, and (b) one or more partially or totally embedded arrangements of image icon focusing elements, the refractive index of which is varied between a first and a second refractive index, the first refractive index being substantially or measurably different than the second refractive index.

The arrangement(s) of image icon focusing elements may be formed from one or from a plurality of materials. For those arrangement(s) of image icon focusing elements with a varying refractive index, which are formed from one material, the arrangement(s) may be prepared by, for example, selectively curing the material so that the degree of crosslinking follows a gradient.

The one or more arrangements of image icon focusing elements used in the practice of the present invention may be selected from the group of:
 i. an array of cylindrical or non-cylindrical lenses (e.g., microlenses including, converging (e.g., convex) lenses, diverging (e.g., concave) lenses, gradient index (GRIN) lenses), air lenses;
 ii. an opaque layer containing a plurality of apertures (e.g., pinhole optics); and
 iii. a reflective layer.

In one preferred embodiment, the focusing elements are non-cylindrical convex or concave microlenses having a spheric or aspheric surface. Aspheric surfaces include conical, elliptical, parabolic, and other profiles. These lenses may have circular, oval, or polygonal (e.g., hexagonal, substantially hexagonal, square, substantially square) base geometries, and may be arranged in regular, irregular, or random, one- or two-dimensional arrays.

In a more preferred embodiment, the microlenses are aspheric concave or convex lenses having polygonal (e.g., hexagonal) base geometries that are arranged in a regular, two-dimensional array on a substrate or light-transmitting polymer film.

In another more preferred embodiment, the focusing elements are convex or concave GRIN microlenses.

The focusing elements, in one contemplated embodiment, have preferred widths (in the case of cylindrical lenses) and base diameters (in the case of non-cylindrical lenses) of less than or equal to 1 millimeter including (but not limited to) widths/base diameters: ranging from about 200 to about 500 microns; and ranging from about 50 to about 199 microns, preferred focal lengths of less than or equal to 1 millimeter including (but not limited to) the sub-ranges noted above, and preferred f-numbers of less than or equal to 10 (more preferably, less than or equal to 6. In another contemplated embodiment, the focusing elements have preferred widths/base diameters of less than about 50 microns (more preferably, less than about 45 microns, and most preferably, from about 10 to about 40 microns), preferred focal lengths of less than about 50 microns (more preferably, less than about 45 microns, and most preferably, from about 10 to about 30 microns), and preferred f-numbers of less than or equal to 10 (more preferably, less than or equal to 6).

The one or more arrangements of image icons used in the practice of the present invention are preferably made up of microstructured image icons (i.e., image icons having a physical relief).

In one embodiment contemplated by the present invention, the image icons are optionally coated and/or filled voids or recesses formed on or within a substrate. The voids or recesses each measure from about 0.5 to about 8 microns in total depth.

In another contemplated embodiment, the image icons are formed from shaped posts formed on a surface of a substrate, each measuring from about 0.5 to about 8 microns in total height.

Although not required by the present invention, optical separation between the arrangements of focusing elements and image icons may be achieved using an optical spacer. In one such embodiment, an optical spacer is bonded to the arrangement(s) of focusing elements. In another embodiment, an optical spacer may be formed as a part of the arrangement(s) of focusing elements, or the thickness of the focusing element arrangement(s) increased to allow the arrangement(s) to be free standing. In yet another embodiment, the optical spacer is bonded to another optical spacer.

The optical spacer may be formed using one or more essentially colorless materials including, but not limited to, polymers such as polycarbonate, polyester, polyethylene, polyethylene napthalate, polyethylene terephthalate, polypropylene, polyvinylidene chloride, and the like.

As described in U.S. Pat. No. 7,333,268 to Steenblik et al., U.S. Pat. No. 7,468,842 to Steenblik et al., and U.S. Pat. No. 7,738,175 to Steenblik et al., arrays of focusing elements and image icons can be formed from a variety of materials such as substantially transparent or clear, colored or colorless polymers such as acrylics, acrylated polyesters, acrylated urethanes, epoxies, polycarbonates, polypropylenes, polyesters, urethanes, and the like, using a multiplicity of methods that are known in the art of micro-optic and microstructure replication, including extrusion (e.g., extrusion embossing, soft embossing), radiation cured casting, and injection molding, reaction injection molding, and reaction casting. High refractive index, colored or colorless materials having refractive indices (at 589 nm, 20° C.) of more than 1.5, 1.6, 1.7, or higher, such as those described in U.S. Patent Application Publication No. US 2010/0109317 A1 to Hoffmuller et al., may also be used in the practice of the present invention.

An exemplary method of manufacture for embodiments described herein is to form the icons as voids in a radiation cured liquid polymer (e.g., acrylated urethane) that is cast against a base film (i.e., an optical spacer), such as 75 gauge adhesion-promoted polyethylene terephthalate (PET) film, then to form the lenses from the radiation cured polymer on the opposite face of the base film in correct alignment or skew with respect to the icons, then to fill the icon voids with a submicron particle pigmented coloring material by gravure-like doctor blading against the film surface, and solidify the fill by suitable means (e.g., solvent removal, radiation curing, or chemical reaction).

The second material has a refractive index that is substantially or measurably different than the refractive index of the material used to form the focusing elements (i.e., the first material). In particular, the difference in these refractive indices causes the focal length of the focusing elements to change at least about 0.1 micron.

The second material may be transparent, translucent, tinted, or pigmented and may provide additional functionality for security and authentication purposes, including support of automated currency authentication, verification, tracking, counting and detection systems, that rely on optical effects, electrical conductivity or electrical capacitance, magnetic field detection. Suitable materials can include adhesives, gels, glues, lacquers, liquids, molded polymers, and polymers or other materials containing organic or metallic dispersions.

The second material is applied to either the first material of the focusing element arrangement(s), or to both the first material of the focusing element arrangement(s) and the arrangement(s) of image icons by transparent printing, molding, sol-gel (chemical solution deposition), curtain coating or blading, flood coating and open air drying/curing, coating and ultraviolet (UV)/energy curing against a smooth cylinder, laminating with adhesive backed film, anilox or metering roller, evaporation, chemical vapor deposition (CVD), physical vapor deposition (PVD), or any other means of applying a substance to a surface, including those described in U.S. Pat. No. 7,333,268 to Steenblik et al., U.S. Pat. No. 7,468,842 to Steenblik et al., and U.S. Pat. No. 7,738,175 to Steenblik et al., all of which, as noted above, are fully incorporated herein by reference as if fully set forth herein.

The optical system of the present invention may further comprise additional features, such as those described in U.S. Pat. No. 7,333,268 to Steenblik et al., U.S. Pat. No. 7,468,842 to Steenblik et al., and U.S. Pat. No. 7,738,175 to Steenblik et al. For example, the inventive system may further comprise textured surfaces for better adhesion to further layers, adhesion promoters, etc.

The inventive optical system will now be described, disclosed, illustrated and shown below in one of its simplest forms that being a system basically comprising (a) an array of image icons, and (b) an array of totally embedded image icon focusing elements. The scope of the present invention is not intended to be, nor should it be deemed to be, limited thereby and such other embodiments as shown or suggested by the teachings herein or by the publications, patent applications, patents and other references mentioned herein, are particularly reserved.

Figure 2:
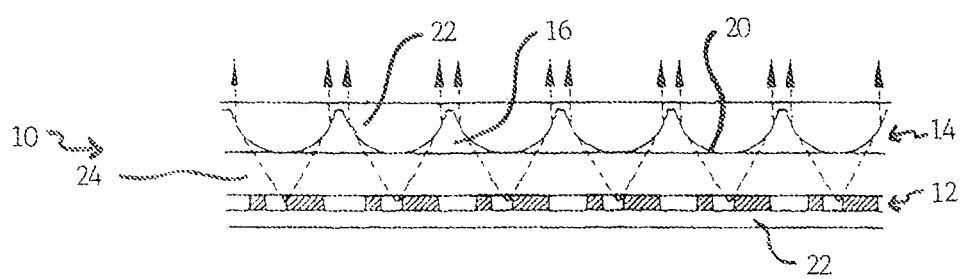
FIG. 2 is a cross-sectional side view of another embodiment of the encapsulated optical system of the present invention, where the optical system employs an array of diverging (e.g., concave) lenses.

Referring now to FIGS. 1 and 2 of the drawings, exemplary embodiments of the system of the present invention are shown generally at 10. System 10 basically comprises:
 (a) an array of image icons 12;
 (b) an array of image icon focusing elements 14 formed from a first material 16 having a refractive index (n1), the array of image icon focusing elements 14 constituting converging (e.g., convex) lenses 18 in FIG. 1 and diverging (e.g., concave) lenses 20 in FIG. 2;
 (c) a second material 22 having a refractive index (n2); and
 (d) an optical spacer 24 positioned between the array of image icons 12 and the array of image icon focusing elements 14,
 wherein, the second material 22 also forms a layer on the array of image icons 12, thereby totally encapsulating the system.

In these exemplary embodiments, the geometry of the lenses and the refractive indices n1 and n2 are tailored to achieve the desired focal length, which in both of these embodiments is greater than zero.

Figure 3:
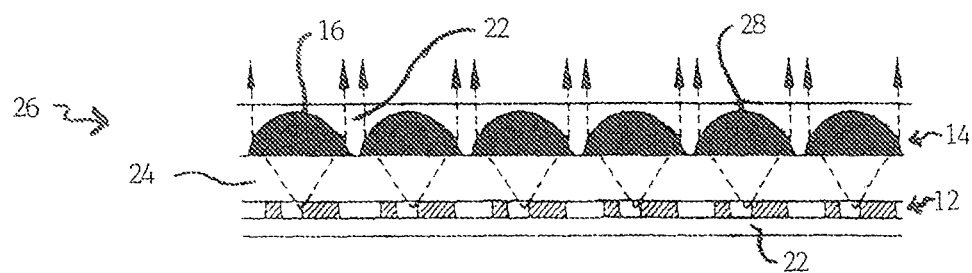
FIG. 3 is a cross-sectional side view of another embodiment of the encapsulated optical system of the present invention, where the optical system employs an array of converging (e.g., convex) gradient-index (GRIN) lenses.

In another exemplary embodiment of the inventive system, which is marked with reference numeral 26 in FIG. 3, the image icon focusing elements are in the form of convex GRIN microlenses 28. Here, the refractive index changes spatially between outer boundaries of the second and first materials 22, 16. This refractive index gradient can be formed by a diffusion process using temperature, using different materials with different molecular weights, exploiting the solubility or miscibility of one of the materials into the other, by selective curing so that the degree of crosslinking follows a gradient or by other techniques known to those skilled in the art. The second material 22, in this embodiment, forms a layer on the array of image icons 12, thereby totally encapsulating the system.

As noted above, the inventive system may be used in the form of, for example, a security strip, thread, patch, or overlay and mounted to a surface of, or at least partially embedded within a fibrous or non-fibrous sheet material (e.g., banknote, passport, ID card, credit card, label), or commercial product (e.g., optical disks, CDs, DVDs, packages of medical drugs), etc., for authentication purposes. The inventive system may also be used in the form of a standalone product (e.g., substrate for subsequent printing or personalization), or in the form of a non-fibrous sheet material for use in making, for example, banknotes, passports, and the like, or it may adopt a thicker, more robust form for use as, for example, a base platform for an ID card, high value or other security document.

When used in the form of a security strip, thread, patch, or overlay, the total thickness of the inventive system is preferably less than about 50 microns (more preferably, less than about 45 microns, and most preferably, from about 10 to about 40 microns). The array of image icon focusing elements is preferably formed from a first material selected from the group of acrylated urethanes, epoxy acrylates and acrylic oligomers, the first material having a refractive index ranging from about 1.5 to about 1.8, and from a second material selected from the group of urethane acrylates and acrylic monomers, the second material having a refractive index ranging from about 1.35 to about 1.49. More preferably, the first material is a modified epoxy acrylate, which is available from Sartomer USA, LLC, 502 Thomas Jones Way, Exton, Pa. 19341 ("Sartomer"), under the product designation CN115, the first material having a refractive index ranging from about 1.549 to about 1.56, while the second material is isodecyl acrylate, which is available from Sartomer under the product designation SR395, the second material having a refractive index ranging from about 1.44 to about 1.45.

The security strips, threads, patches and overlays may be partially embedded within or mounted on a surface of a document. For partially embedded strips and threads, portions thereof are exposed at the surface of the document at spaced intervals along the length of the strip or thread at windows or apertures in the document.

The inventive optical security devices may be at least partially incorporated in security papers during manufacture by techniques commonly employed in the papermaking industry. For example, the inventive security device in the form of a strip or thread may be fed into a cylinder mold papermaking machine, cylinder vat machine, or similar machine of known type, resulting in total or partial embedment of the strip or thread within the body of the finished paper.

The security strips, threads, patches and overlays may also be adhered or bonded to a surface of a document with or without the use of an adhesive. Bonding without the use of an adhesive may be achieved using, for example, thermal welding techniques such as ultrasonic welding, vibration welding, and laser fusing. Adhesives for adhering the inventive devices to a surface of a document may be one of hot melt adhesives, heat activatable adhesives, pressure sensitive adhesives, and polymeric laminating films. These adhesives are preferably crosslinkable in nature, such as UV cured acrylic or epoxy, with crosslinking achieved while the adhesive is in the melt phase.

In another contemplated embodiment, the inventive system forms part of a label construction containing a transparent or translucent adhesive (i.e., the second material) in contact with the first material of the arrangement(s) of focusing elements or lens layer. The inventive system may be placed on the inside of a package, so that the synthetic image(s) remains visible.

When used in the form of a base platform for an ID card, high value or other security document, the total thickness of the inventive system is preferably less than or equal to about 1 millimeter (mm) including (but not limited to) thicknesses: ranging from about 200 to about 500 microns; ranging from about 50 to about 199 microns; and of less than about 50 microns. The array of image icon focusing elements is preferably formed from a first material selected from the group of urethane acrylates and acrylic monomers, the first material having a refractive index ranging from about 1.35 to about 1.49. The second material is preferably selected from the group of epoxy acrylates, polyester oligomers, poly(aromatic carbonates), and poly(aliphatic carbonates), the second material having a refractive index ranging from about 1.5 to about 1.8. More preferably, the first material is tri(propylene glycol) diacrylate, which is available from Sartomer under the product designation SR306, the first material having a refractive index ranging from about 1.449 to about 1.46, while the second material is polycarbonate, which is available from Bayer MaterialScience AG, Kaiser-Wilhelm-Allee, 51368 Leverkusen Germany, the second material having a refractive index ranging from about 1.584 to about 1.685.

In this embodiment, concave lens shapes would be formed into an optical spacer using the lower refractive index material (i.e., the first material). A polycarbonate layer having a higher refractive index (i.e., the second material), would be placed over the concave lenses. Heat and pressure would then be applied to squeeze out the air trapped within and press the polycarbonate into the lens cavities. Once cooled, the system would present sharply focused synthetic images with a smooth, protective top layer.

While various embodiments of the present invention have been described above, it should be understood that they have been presented by way of example only, and not limitation. Thus, the breadth and scope of the present invention should not be limited by any of the exemplary embodiments.

We claim:

1. A system for projecting one or more synthetic optical images, which demonstrates improved resistance to optically degrading external effects, and which comprises:
    (a) one or more arrangements of microstructured image icons; and
    (b) one or more embedded arrangements of image icon focusing elements, wherein interstitial spaces between at least a portion of the image icon focusing elements are filled and the focusing elements are covered,
    wherein the one or more arrangements of image icon focusing elements is disposed above the one or more arrangements of microstructured image icons such that at least a portion of the image icon focusing elements forms at least one synthetic image of at least a portion of the image icons,
    wherein all interfaces responsible for focus are embedded within the system,
    wherein the microstructured image icons are selected from the group consisting of (a) optionally coated and/or filled voids or recesses formed on or within a substrate, wherein the voids or recesses each measure from about 0.5 to about 8 microns in total depth, and (b) shaped posts formed on a surface of a substrate, wherein the shaped posts each measure from about 0.5 to about 8 microns in total height.

2. The system of claim 1, wherein the image icon focusing elements are refractive focusing elements having a focal length, the system having a refractive index from an outer surface to refracting interfaces that is varied between a first and a second refractive index, the first refractive index being substantially or measurably different than the second refractive index.

3. The system of claim 2, wherein the difference between the first refractive index and the second refractive index causes a change of at least about 0.1 micron in the focal length of the focusing elements.

4. The system of claim 1, which comprises: (a) an array of image icons; (b) an array of image icon focusing elements formed from a first material having a refractive index (n1); and (c) a second material having a different refractive index (n2) that fills interstitial spaces between and covers the focusing elements, a distinct interface being formed between the first and second materials.

5. The system of claim 4, wherein the second material forms an outer boundary or layer of the array of image icons, thereby also embedding the array of image icons.

6. The system of claim 1, which comprises: (a) an array of image icons; and (b) an array of image icon focusing elements formed from a first material having a refractive index (n1) and a second material having a different refractive index (n2), the second material diffusing into the first material thereby forming a gradient interface with the first material.

7. The system of claim 4 or 6, wherein the first material has a refractive index ranging from about 1.5 to about 1.8.

8. The system of claim 7, wherein the first material is selected from the group of acrylated urethanes, epoxy acrylates and acrylic oligomers.

9. The system of claim 7, wherein the first material has a refractive index ranging from about 1.549 to about 1.56.

10. The system of claim 9, wherein the first material is a modified epoxy acrylate.

11. The system of claim 4 or 6, wherein the second material has a refractive index ranging from about 1.35 to about 1.49.

12. The system of claim 11, wherein the second material is selected from the group of urethane acrylates and acrylate monomers.

13. The system of claim 11, wherein the second material has a refractive index ranging from about 1.44 to about 1.45.

14. The system of claim 13, wherein the second material is isodecyl acrylate.

15. The system of claim 4 or 6, wherein the second material is a transparent or translucent adhesive.

16. A sheet material made from the system for projecting one or more synthetic optical images of claim 4 or 6.

17. A base platform made from the system for projecting one or more synthetic optical images of claim 4 or 6.

18. The base platform of claim 17, wherein the first material has a refractive index ranging from about 1.35 to about 1.49.

19. The base platform of claim 18, wherein the first material is selected from the group of urethane acrylics and acrylic monomers.

20. The base platform of claim 18, wherein the first material has a refractive index ranging from about 1.449 to about 1.46.

21. The base platform of claim 20, wherein the first material is tri(propylene glycol) diacrylate.

22. The base platform of claim 17, wherein the second material has a refractive index ranging from about 1.5 to about 1.8.

23. The base platform of claim 22, wherein the second material is selected from the group of epoxy acrylates, polyester oligomers, poly(aromatic carbonates), and poly(aliphatic carbonates).

24. The base platform of claim 22, wherein the second material has a refractive index ranging from about 1.584 to about 1.685.

25. The base platform of claim 24, wherein the second material is polycarbonate.

26. The base platform of claim 17, wherein the second material is a transparent or translucent adhesive.

27. A security device made from the system for projecting one or more synthetic optical images of claim 4 or 6.

28. The system of claim 4 or 6, wherein the first material is a high refractive index, colored or colorless material having a refractive index of more than 1.7.

29. The system of claim 4 or 6, wherein the second material is a high refractive index, colored or colorless material having a refractive index of more than 1.7.

30. The system of claim 4 or 6, wherein the focusing elements are selected from the group of converging lenses and diverging lenses.

31. The system of claim 1, wherein the one or more embedded arrangements of image icon focusing elements includes image icon focusing elements selected from the group of cylindrical lenses and non-cylindrical lenses.

32. The system of claim 31, wherein the one or more embedded arrangements of image icon focusing elements includes cylindrical lenses.

33. The system of claim 31, wherein the one or more embedded arrangements of image icon focusing elements includes non-cylindrical lenses.

34. The system of claim 31, wherein the lenses have spheric or aspheric surfaces.

35. The system of claim 31, wherein the lenses have widths or base diameters of less than or equal to about 1 millimeter.

36. The system of claim 35, wherein the lenses have widths or base diameters ranging from about 200 to about 500 microns.

37. The system of claim 35, wherein the lenses have widths or base diameters ranging from about 50 to about 199 microns.

38. The system of claim 35, wherein the lenses have widths or base diameters of less than about 50 microns.

39. The system of claim 38, wherein the lenses have widths or base diameters of less than about 45 microns.

40. The system of claim 39, wherein the lenses have widths or base diameters ranging from about 10 to about 40 microns.

41. The system of claim 1 or 31, wherein the system has a thickness of less than or equal to about 1 millimeter.

42. The system of claim 41, wherein the system has a thickness ranging from about 200 to about 500 microns.

43. The system of claim 41, wherein the system has a thickness ranging from about 50 to about 199 microns.

44. The system of claim 41, wherein the system has a thickness of less than about 50 microns.

45. A sheet material made from the system for projecting one or more synthetic optical images of claim 1.

46. The sheet material of claim 45, which is selected from the group of substrates for subsequent printing or personalization, sheet materials for security documents, and base platforms for identification cards and security documents.

47. The sheet material of claim 46, which is a sheet material for security documents.

48. The sheet material of claim 46, which is a base platform for identification cards and security documents.

49. The sheet material of claim 45 or 46, wherein the sheet material has a thickness of less than or equal to about 1 millimeter.

50. The sheet material of claim 49, wherein the sheet material has a thickness of from about 200 to about 500 microns.

51. The sheet material of claim 49, wherein the sheet material has a thickness of from about 50 to about 199 microns.

52. The sheet material of claim 49, wherein the sheet material has a thickness of less than about 50 microns.

53. A security device made from the system for projecting one or more synthetic optical images of claim 1.

54. The security device of claim 53, which is selected from the group of security strips, threads, patches, and overlays, for mounting on a surface of, or at least partially embedding within, a sheet material.

55. The security device of claim 53 or 54, wherein the security device has a thickness of less than about 50 microns.

56. The security device of claim 55, wherein the security device has a thickness of less than about 45 microns.

57. The security device of claim 56, wherein the security device has a thickness of from about 10 to about 40 microns.

58. A sheet material having opposing surfaces and comprising at least one security device of claim 54 mounted on a surface of, or at least partially embedded within, the sheet material.

59. A document made from the sheet material of claim 58.

60. The document of claim 59, which is selected from the group of banknotes, passports, identification cards, credit cards, and labels.

61. The document of claim 60, which comprises a banknote.

62. The system of claim 1, wherein optical separation between the arrangements of image icons and image icon focusing elements is achieved using an optical spacer.

63. The system of claim 62, wherein the optical spacer is formed using a material selected from the group consisting of polycarbonates, polyesters, polyethylenes, polyethylene napthalates, polyethylene terephthalates, polypropylenes, polyvinylidene chlorides, and combinations thereof.

64. The system of claim 1, wherein an outer boundary of the one or more embedded arrangements of image icon focusing elements is a planar surface.

65. The system of claim 1, wherein the one or more embedded arrangements of image icon focusing elements are refractive image icon focusing elements.

66. A sheet material made from a system for projecting one or more synthetic optical images, wherein the system comprises: (a) an array of image icons; (b) an array of refractive image icon focusing elements disposed above the array of image icons and formed from a first material having a refractive index (n1); and (c) a second material having a different refractive index (n2) that fills interstitial spaces between and covers the focusing elements, a distinct interface being formed between the first and second materials, wherein the microstructured image icons are selected from the group consisting of (a) optionally coated and/or filled voids or recesses formed on or within a substrate, wherein the voids or recesses each measure from about 0.5 to about 8 microns in total depth, and (b) shaped posts formed on a surface of a substrate, wherein the shaped posts each measure from about 0.5 to about 8 microns in total height.

67. A sheet material made from a system for projecting one or more synthetic optical images, wherein the system comprises: (a) an array of image icons; and (b) an array of refractive image icon focusing elements disposed above the array of image icons and formed from a first material having a refractive index (n1) and a second material having a different refractive index (n2), the second material filling interstitial spaces between at least a portion of the image icon focusing elements, covering the focusing elements, and diffusing into the first material thereby forming a gradient interface with the first material, wherein the microstructured image icons are selected from the group consisting of (a) optionally coated and/or filled voids or recesses formed on or within a substrate, wherein the voids or recesses each measure from about 0.5 to about 8 microns in total depth, and (b) shaped posts formed on a surface of a substrate, wherein the shaped posts each measure from about 0.5 to about 8 microns in total height.

68. A sheet material having opposing surfaces and comprising at least one security device mounted on a surface of, or at least partially embedded within, the sheet material, wherein the security device is made from a system for projecting one or more synthetic optical images, the system comprising:

(a) one or more arrangements of image icons; and
(b) one or more embedded arrangements of refractive image icon focusing elements, wherein interstitial spaces between at least a portion of the image icon focusing elements are filled and the focusing elements are covered, wherein the one or more arrangements of refractive image icon focusing elements is disposed above the one or more arrangements of image icons such that at least a portion of the image icon focusing elements forms at least one synthetic image of at least a portion of the image icons, wherein all interfaces responsible for focus are embedded within the system, wherein the microstructured image icons are selected from the group consisting of (a) optionally coated and/or filled voids or recesses formed on or within a substrate, wherein the voids or recesses each measure from about 0.5 to about 8 microns in total depth, and (b) shaped posts formed on a surface of a substrate, wherein the shaped posts each measure from about 0.5 to about 8 microns in total height.

69. A document made from the sheet material of claim 68.

70. The document of claim 69, which is selected from the group of banknotes, passports, identification cards, credit cards, and labels.

71. The document of claim 70, which comprises a banknote.

72. A system for projecting one or more synthetic optical images, which demonstrates improved resistance to optically degrading external effects, and which comprises:

(a) one or more arrangements of image icons; and
(b) one or more embedded arrangements of refractive image icon focusing elements, wherein interstitial spaces between at least a portion of the image icon focusing elements are filled and the focusing elements are covered, wherein the one or more arrangements of refractive image icon focusing elements is disposed above the one or more arrangements of image icons such that at least a portion of the image icon focusing elements forms at least one synthetic image of at least a portion of the image icons, wherein all interfaces responsible for focus are embedded within the system, and wherein optical separation between the arrangements of image icons and refractive image icon focusing elements is achieved using an optical spacer, wherein the microstructured image icons are selected from the group consisting of (a) optionally coated and/or filled voids or recesses formed on or within a substrate, wherein the voids or recesses each measure from about 0.5 to about 8 microns in total depth, and (b) shaped posts formed on a surface of a substrate, wherein the shaped posts each measure from about 0.5 to about 8 microns in total height.

73. The system of claim 72, wherein the optical spacer is formed using a material selected from the group consisting of polycarbonates, polyesters, polyethylenes, polyethylene napthalates, polyethylene terephthalates, polypropylenes, polyvinylidene chlorides, and combinations thereof.

74. A system for projecting one or more synthetic optical images, which demonstrates improved resistance to optically degrading external effects, and which comprises:

(a) one or more arrangements of microstructured image icons; and
(b) one or more embedded arrangements of image icon focusing elements, wherein interstitial spaces between at least a portion of the image icon focusing elements are filled and the focusing elements are covered, wherein the one or more arrangements of image icon focusing elements is disposed above the one or more arrangements of microstructured image icons such that at least a portion of the image icon focusing elements forms at least one synthetic image of at least a portion of the image icons, wherein all interfaces responsible for focus are embedded within the system, wherein the microstructured image icons are optionally coated and/or filled voids or recesses formed on or within a substrate, wherein the voids or recesses each measure from about 0.5 to about 8 microns in total depth.

75. The system of claim 74, wherein the image icon focusing elements are refractive focusing elements.

76. The system of claim 74 or 75, wherein the voids or recesses are filled with a submicron particle pigmented coloring material.

77. A system for projecting one or more synthetic optical images, which demonstrates improved resistance to optically degrading external effects, and which comprises:

(a) one or more arrangements of microstructured image icons; and
(b) one or more embedded arrangements of image icon focusing elements, wherein interstitial spaces between at least a portion of the image icon focusing elements are filled and the focusing elements are covered, wherein the one or more arrangements of image icon focusing elements is disposed above the one or more arrangements of microstructured image icons such that at least a portion of the image icon focusing elements forms at least one synthetic image of at least a portion of the image icons, wherein all interfaces responsible for focus are embedded within the system, wherein the microstructured image icons are formed from shaped posts formed on a surface of a substrate, wherein the shaped posts each measure from about 0.5 to about 8 microns in total height.

* * * * *